United States Patent
Renneberg

(10) Patent No.: US 8,345,215 B2
(45) Date of Patent: Jan. 1, 2013

(54) OPTICAL MEANS FOR CALIBRATING TEMPERATURE

(75) Inventor: Carl Peter Renneberg, Dulwich Hill (AU)

(73) Assignee: Corbett Research Pty Ltd, Mortlake, New South Wales (AU)

( * ) Notice: Subject to any disclaimer, the term of this patent is extended or adjusted under 35 U.S.C. 154(b) by 1151 days.

(21) Appl. No.: 10/516,185

(22) PCT Filed: May 30, 2003

(86) PCT No.: PCT/AU03/00673
§ 371 (c)(1), (2), (4) Date: Sep. 1, 2005

(87) PCT Pub. No.: WO03/102522
PCT Pub. Date: Dec. 11, 2003

(65) Prior Publication Data
US 2006/0077311 A1   Apr. 13, 2006

(30) Foreign Application Priority Data
May 30, 2002 (AU) ........................ PS2677

(51) Int. Cl.
G02F 1/13 (2006.01)
(52) U.S. Cl. ............. 349/199; 349/19; 349/20; 349/21; 349/22; 73/147; 422/82.05; 422/82.08; 422/400; 374/120; 374/159; 374/161
(58) Field of Classification Search ............. 349/19–22; 422/82.08, 55; 374/120, 159, 161
See application file for complete search history.

(56) References Cited

U.S. PATENT DOCUMENTS

| 4,863,282 A * | 9/1989 | Rickson .................. 374/162 |
| 4,968,632 A | 11/1990 | Brauer et al. |
| 5,936,292 A * | 8/1999 | Koide et al. .............. 257/412 |
| 6,022,141 A | 2/2000 | Bass et al. |
| 6,296,911 B1 | 10/2001 | Catarineu Guillén |
| 6,297,018 B1 * | 10/2001 | French et al. ............... 435/6 |
| 2003/0008308 A1 * | 1/2003 | Enzelberger et al. ......... 435/6 |

FOREIGN PATENT DOCUMENTS

DE    2735199 A1   2/1979
(Continued)

OTHER PUBLICATIONS

Chaudhari et al., Transient liquid crystal thermometry of microfabricated PCR vessel arrays, Dec. 1998, IEEE, Journal of microelectromechanical systems, vol. 7, No. 4, p. 345-355.*

(Continued)

*Primary Examiner* — In Suk Bullock
*Assistant Examiner* — Robert Eom
(74) *Attorney, Agent, or Firm* — Baker Donelson Bearman Caldwell & Berkowitz

(57) ABSTRACT

The invention relates to a system and method for the optical calibration of the temperature of a micro-environment. The system comprises a thermochromic liquid crystal in combination with a luminophore. The steps of the method comprise providing in combination in the micro-environment at least one thermochromic liquid crystal and a luminophore, varying the temperature of the environment while irradiating the combination with light that includes light at one or more excitation wavelengths of the luminophore, and monitoring luminescence emitted by the combination while recording the temperature of the environment.

8 Claims, 8 Drawing Sheets

FOREIGN PATENT DOCUMENTS

WO  98/49340  11/1998

OTHER PUBLICATIONS

Childs et al., Review of temperature measurement, Aug. 2000, American institute of physics, Review of scientific instruments, vol. 71, No. 8, p. 2959-2978.*

Derwent Abstract Accession No. 90-008030/02, DD 270448 A (Luther-Univ Halle) Aug. 2, 1989.
Derwent Abstract Accession No. D3535C/15, SU 678342 (AS UKR Semiconduct (KIRA=)) Aug. 5, 1979.
Derwent Abstract Accession No. 85-112494/19, FR 255877 A (ETEC) Apr. 5, 1985.

* cited by examiner

OPTICAL MEANS FOR CALIBRATING TEMPERATURE

The present application claims priority under 35 U.S.C. §365(c) to PCT international application PCT/AU03/00673, filed on May 30, 2003, which claimed priority under 35 U.S.C. §365(b) to Australian Provisional Patent Application No. PS 2677, filed May 30, 2002, each of which is incorporated by reference in its entirety.

TECHNICAL FIELD

The invention described herein relates to processes that are carried out at a temperature other than ambient. That is, processes which include raising or lowering the temperature in the environment of the process to a desired value. More particularly, the invention relates to a means for determining the actual temperature at specific locations within the environment of the process.

BACKGROUND ART

Many processes—particularly chemical processes—include steps that are carried out at a specific temperature. The efficacy of a particular step may in fact be dependent on the execution of the step at a specific temperature. It may be necessary to either heat or cool the environment in which the process is being carried out to the desired temperature. Monitoring of the temperature of the environment of a process is necessary so that heating or cooling can be terminated once the desired temperature is reached. Continued monitoring of the environment temperature is required so that the temperature can be maintained at the desired level by heating or cooling as necessary. The same considerations apply when different temperatures are required for further steps in a process.

Means for monitoring temperature are readily available including means for measuring temperature at specific sites within the environment of a process that has temperature-dependent steps. For example, sensors are known which can be affixed to a solid object to continuously monitor the temperature of the object. Probes are also known that can be inserted into a reaction mixture for the continuous monitoring of the temperature of the mixture.

While it is generally easy to monitor the temperature of the overall environment of a process, it is not always easy to monitor the temperature of process microenvironments. This is despite the existence of probes and sensors for localised monitoring of temperature. An example of a process where micro-environment temperature monitoring is desirable, but difficult to achieve with an accuracy of less than one degree Celsius, is a thermal cycling reaction such as for amplification of DNA. The need for micro-environment monitoring of temperature in such a process will now be explained.

DNA can be amplified by the polymerase chain reaction. In this technique, a denatured duplex DNA sample is incubated with a molar excess of two oligonucleotide primers, one being complementary to a first short sequence of the DNA duplex and the other being identical to a second short sequence upstream of the first short sequence (i.e., more 5' of the first short sequence). Each primer anneals to its complementary sequence and primes the template-dependent synthesis by DNA polymerase of a complementary strand which extends beyond the site of annealing of the other primer through the incorporation of deoxynucleotide triphosphates. Each cycle of denaturation, annealing and synthesis affords an approximate doubling of the amount of target sequence, where the target sequence is defined as the DNA sequence subtended by and including the primers. A cycle is controlled by varying the temperature to permit successive denaturation of complementary strands of duplex DNA, annealing of the primers to their complementary sequences, and primed synthesis of new complementary sequences. The use of a thermostable DNA polymerase obviates the necessity of adding new enzyme for each cycle, thus allowing automation of the DNA amplification process by thermal cycling. Twenty amplification cycles increases the amount of target sequence by approximately one million-fold.

Devices are available for the thermal cycling of multiple samples, typically for the amplification of DNA. A common format of such devices is the inclusion of a block of heat conductive material which has a plurality of channels or cavities therein for receiving vessels—such as microcentrifuge tubes—in which the desired reactions are executed. Monitoring of temperature is relatively easy in such devices since a temperature probe can be associated with the block.

Devices for thermal cycling of reaction mixtures are also known in which the reaction vessels are held in a rotor which is rotated in a controlled temperature environment such as an insulated chamber containing the rotor. Temperature cycling is effected by heating and cooling of the environment. Such a device is disclosed, for example, in International Patent Application No. PCT/AU98/00277 (Publication No. WO 98/49340).

Since reaction mixtures are rotated in the PCT/AU99/00277 device, it is difficult to accurately measure the temperature of a reaction mixture. Regardless of how well the temperature of the rotor environment is controlled, there can be a temperature difference between a reaction mixture and the environment per se. Since accurate temperature control is essential for most thermal cycling reactions, knowledge of the actual temperature of reaction mixtures is important. Compensation can then be made in the environmental temperature management program to give a desired temperature in an actual reaction mixture.

There is thus a need for a means of determining temperature in a micro-environment when it is not possible to use available temperature sensors in connection with the particular micro-environment. With such a means, it would be possible to calibrate temperature control throughout an environment.

SUMMARY OF THE INVENTION

The object of the invention is to provide a means for determining the temperature of a specific micro-environment of an environment which does not require a physical connection between a temperature sensitive component in the micro-environment and the temperature recordation equipment.

In a first embodiment, the invention provides a system for the optical calibration of the temperature of a micro-environment, the system comprising a thermochromic liquid crystal in combination with a luminophore.

In a second embodiment, the invention provides a method for the optical calibration of the temperature of a micro-environment, the method comprising the steps of:
 a) providing in combination in said micro-environment at least one thermochromic liquid crystal and a luminophore;
 b) varying the temperature of the environment while irradiating said combination with light that includes light at one or more excitation wavelengths of said luminophore; and c) monitoring luminescence emitted by said combination while recording the temperature of said environment.

The term "environment" is used in the foregoing definition of the method of the invention and hereafter to define any environment in which a process is carried out at a specific temperature or has at least a step that requires a specific temperature for its execution. The term thus includes a heated reaction chamber or a heated block having at least one cavity for holding a reaction vessel. The term furthermore includes an environment wherein the temperature is controlled by heating or cooling the environment as necessary The term "micro-environment" is used above and herein to denote any, typically small, portion of a temperature-controlled environment. The term thus embraces the interior of a reaction vessel within a larger reaction chamber such as the temperature-controlled chamber of a thermal cycler.

With regard to the first embodiment of the invention, the thermochromic liquid crystal (hereafter "the TLC") is typically a "clearing point" type TLC. With these types of TLCs, at a certain temperature called the transition temperature, or clearing point, the composition changes from opaque to clear. Such TLCs are commercially available over a broad range of transition temperatures. The following table is a sample of suitable clearing point TLCs available from Hallcrest Inc., of 1820 Pickwick Lane, Glenview, Ill., USA.

| TLC | Nominal Transition Temperature (° C.) | Colour Below Transition Temperature |
| --- | --- | --- |
| R50C | 50 | Red |
| G81C | 81 | Green |

The TLC can also be a "temperature-sensitive" type TLC. With this type of TLC, below a certain temperature, called the "Red Start" temperature, the TLC is mostly clear. Above a second, higher temperature which is the clearing point temperature, the TLC is also mostly clear. Between these two temperatures, the TLC selectively reflects visible light. At the Red Start temperature, the TLC changes to a state in which it strongly reflects red light. At the Blue Start temperature, the TLC changes to a state in which in strongly reflects Blue light. As the temperature of the environment in which the TLC is held increases, the colour of light that the TLC reflects most strongly decreases in wavelength, from red to orange, yellow, green, blue, and then violet.

Like clearing point TLCs, temperature-sensitive TLCs are available from Hallcrest Inc. and include the following:

| TLC | Nominal Red Start Temperature (° C.) | Nominal Blue Start Temperature (° C.) |
| --- | --- | --- |
| R35C1W | 35 | 36 |
| R40C1W | 40 | 41 |

By monitoring the output of the light detector, and by suitable design of a clearing point TLC/luminophore system, the vessel containing the system, the light source, and the detector, it can be determined when the vessel and its contents are at, above, or below a temperature at which optical properties suddenly change, hereafter referred to as an "event temperature". In the case of a clearing point TLC, an example of an event temperature is the TLC's transition temperature.

Similarly, by monitoring the output of the light detector, and by suitable design of a temperature-sensitive TLC/luminophore system, the vessel containing the system, the light source, and the detector, it can be determined when the vessel and its contents are at, above, or below a temperature at which the TLC's optical properties suddenly change. In the case of a temperature-sensitive TLC, an example of such an event temperature is the temperature at which the TLC most strongly reflects or redirects a particular wavelength of light from the vessel's light source.

At a temperature far enough below its transition temperature, the TLC will melt—that is, change from a solid state to a liquid state. As it melts, the TLC's optical properties will also change. In a suitably designed TLC/luminophore system, the melting point of the TLC can also serve as an event temperature for the purposes of temperature calibration.

The system for optical calibration can include a plurality of TLCs. That is, TLCs with different event temperatures can be included in the system as either discrete components or a mixture.

The luminophore can be present in many different forms including in liquid, gaseous and solid forms. For example, the luminophore can be present as an aqueous or organic solution. The luminophore can also be present in combination with another substance to which it is bound. In solid form, for example, the luminophore can be provided as an internal or external coating on an inert support such as plastic spheres of a few micrometers in diameter.

The luminophore can be fluorescent, with a short decay lifetime, such as a few nanoseconds. The luminophore can also be phosphorescent, with a much longer decay lifetime, such as a few microseconds or more. The luminophore can further comprise a combination of fluorescent and/or phosphorescent components.

In the system per se, the luminophore can be distributed throughout the TLC or the luminophore and TLC can be present as discrete layers within the container of the system, typically a small vial capable of holding microliter quantities of material. Such layering can be achieved through providing the TLC and luminophore as immiscible liquids or with one a liquid and the other a solid. The TLC and luminophore can also be physically separated. For example, the luminophore can be in one vial which is within another vial containing the TLC. The TLC can also comprise a coating on the vial containing the luminophore. In another form, the luminophore may be located some distance away from the vial. These alternatives will be explained in greater detail below.

With regard to the method of the invention, it will be appreciated that the method's efficacy lies in the ability of the TLC luminophore system to sensitively indicate the temperature at essentially a point within the environment containing the system. Such "points" include the equivalent of a small reaction mixture within a reaction chamber or heating block.

With a TLC/luminophore system employing a clearing point TLC, the detected luminescence changes sharply as the temperature of the TLC passes through its transition point. In some embodiments (hereafter called "positive clearing point" embodiments), the detected luminescence shows a sharp increase at the transition temperature, with the detected luminescence having low values at temperatures below the transition point, and high values at temperatures above that point. In other embodiments (hereafter called "negative clearing point" embodiments), the detected luminescence shows a sharp decrease at the transition temperature, with the detected luminescence having high values at temperatures below the transition point, and low values at temperatures above the transition point.

At the transition temperature, a small change in temperature generates a large change in detected luminescence. With the method, and using the transition temperature as the event temperature, it is therefore possible to calibrate temperature to an accuracy of about 0.1° C.

With some positive clearing point embodiments, the detected luminescence is low at temperatures below the transition point because the opacity of the TLC prevents excitation of the luminophore by the light source. In other positive clearing point embodiments, it is because the opacity of the TLC prevents luminescence emitted by the luminophore from reaching the light detector. In still further positive clearing point embodiments, both of the foregoing situations apply. At the transition temperature, as the TLC changes from opaque to clear, the TLC blocks very little light, causing the light detector to sense a sharp increase in luminescence.

With some negative clearing point embodiments, the detected luminescence is high at temperatures below the transition point because the opacity of the TLC reflects or redirects light from the light source to the luminophore, which in turn emits light into the light detector. In other negative clearing point embodiments, it is because the opacity of the TLC reflects or redirects luminescent light from the luminophore to the light detector. In still further negative clearing point embodiments, both of the foregoing situations apply. At the transition temperature, as the TLC changes from opaque to clear, the TLC directs very little light to the light detector, causing it to sense a sharp decrease in luminescence.

We now turn to TLC/luminophore systems comprising a temperature-sensitive TLC. In some embodiments (hereafter called "negative temperature-sensitive" embodiments), the detected luminescence is high at temperatures below the Red Start temperature, and is also high at temperatures above the clearing point temperature. At some intermediate temperatures, the detected luminescence is low. In certain other embodiments (hereafter called "positive temperature-sensitive" embodiments), the detected luminescence is low at temperatures below the Red Start temperature, and low at temperatures above the clearing point; at some intermediate temperatures, the detected luminescence is high.

Still further TLC/luminophore systems with temperature-sensitive TLCs can have different characteristics of detected luminescence versus temperature, depending on the exact arrangement and design of the system.

In some negative temperature-sensitive embodiments, the detected luminescence is low at particular temperatures because the light source comprises a narrow band of wavelengths, such as 10 nm or less, and the TLC lies between the light source and the luminophore. When a temperature is reached where it strongly reflects those wavelengths (hereafter called a "source-blocking temperature"), the TLC will strongly reduce the excitation of the luminophore. In some other negative temperature-sensitive embodiments, the detected fluorescence is low because the light detector is sensitive to only a narrow band of wavelengths and the TLC lies between the luminophore and the light detector. When a temperature is reached where it strongly reflects those wavelengths (hereafter called a "detector-blocking temperature"), the TLC will strongly reduce the excitation of the light detector. In still further negative temperature-sensitive embodiments, both of the foregoing situations apply.

In some positive temperature-sensitive embodiments, the detected luminescence is high at a particular temperature because the light source comprises a narrow band of wavelengths, such as 10 nm or less, and, at that particular temperature (hereafter called a "source-enabling temperature"), the TLC strongly reflects or directs those wavelengths into the luminophore, which in turn excites the light detector. In some other positive temperature-sensitive embodiments, the detected luminescence is high at a particular temperature because the light detector is sensitive to only a narrow band of wavelengths and, at that particular temperature (hereafter called a "detector enabling temperature"), the TLC strongly reflects or directs those wavelengths from the luminophore into the light detector. In still further positive temperature-sensitive embodiments, both of the foregoing situations apply.

With suitable design of the system, then near the TLC's event temperatures (which may be source-blocking, source-enabling, detector-blocking, or detector-enabling temperatures, depending on the exact design of the system), a small change in temperature generates a large change in detected luminescence. With this method, it is therefore possible to calibrate temperature with an accuracy of about 0.1° C. as with the clearing point TLC system.

In the method of the invention, excitation of the luminophore can be by way of any of the light sources known to those of skill in the art. Luminescence detection can similarly be by any known detection system.

Temperature calibration is possible through use of the method of the invention since the event temperature of the TLC can be correlated with the actual environment temperature. As noted above, the reaching of such a temperature of the TLC is readily detectable by virtue of the dramatic change in detected luminescence. The inclusion of more than one TLC in the system allows an even more sensitive temperature calibration as a plot of the micro-environment temperature versus environment temperature relationship can be generated.

When measured in small steps, such as about 0.1° C., about an event temperature, the relationship between TLC temperature and detected luminescence may show more than one sudden transition. An example of this will be given below, in the description of FIG. 12, where the two largest transitions are identified. For temperature calibration, one can use a single transition or multiple transitions, in the luminescence versus temperature relationship, as calibration points.

Having broadly described the invention, specific detail of systems and the method will now be given with reference to the accompanying drawings briefly described hereafter.

BEST MODE AND OTHER MODES OF CARRYING OUT THE INVENTION

Figure 1:
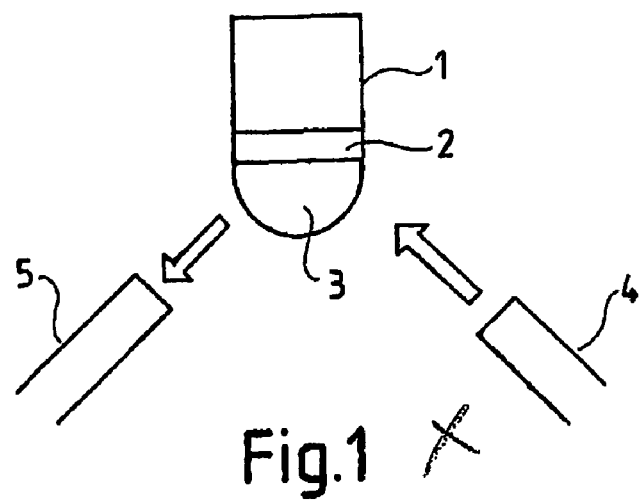
FIGS. 1 to 9 are schematic representations of various TLC/luminophore systems according to the invention.

With reference to FIG. 1, there is shown a transparent vial 1 having therein a liquid luminophore-containing component 2 layered over a TLC component 3. The system comprising components 2 and 3 is irradiated by light source 4 and any luminescence emitted by component 2 detected by detector 5.

In FIG. 1, in the case where TLC 3 is a clearing point TLC, the system operates as follows. At temperatures below its transition temperature, TLC 3 will significantly block excitation of luminophore 2. At those temperatures, TLC 3 will also significantly block light emitted by luminophore 2 from reaching light detector 5. Conversely, at temperatures above the TLC's transition temperature, when the TLC is mostly clear, light source 4 will excite luminophore 2, and the emitted luminescence detected at detector 5. At the TLC's transition temperature, a small change in temperature will therefore result in a large change in detected luminescence. With a clearing point TLC, the system in FIG. 1 can be used to implement a "positive clearing point" system.

In FIG. 1, in the case where TLC 3 is a temperature-sensitive TLC, the system works as follows. At temperatures below the TLC's Red Start temperature, TLC 3 is mostly clear. Light from 4 will excite luminophore 2, and the luminescence emitted by luminophore 2 will be detected at detector 5.

At temperatures above the TLC's clearing point temperature, TLC 3 is also mostly clear. Light from 4 will excite luminophore 2, and the luminescence emitted by luminophore 2 will be detected at detector 5.

If light source 4 emits only a narrow band of wavelengths (e.g. a band 10 nm wide), then at a certain temperature between its Red Start and clearing point temperatures—the "source-blocking temperature"—TLC 3 will strongly reflect the light from 4, significantly blocking excitation of luminophore 2.

If light detector 5 is sensitive to only a narrow band of wavelengths (e.g. a band 10 nm wide), then at a certain temperature between its Red Start and clearing point temperatures—the "detector-blocking temperature"—TLC 3 will strongly reflect or redirect the light from 2, significantly blocking luminescence in the detector's sensitive wavelength band from reaching the detector.

In summary, for temperature-sensitive TLC 3, at temperatures very close to the source-blocking and/or detector-blocking temperatures, light detector 5 will detect a greatly reduced amount of light. At temperatures close to the blocking temperature (or temperatures), a small change in temperature will result in a large change in detected luminescence. With a temperature-sensitive TLC, the system of FIG. 1 can be used to implement a "negative temperature-sensitive" system.

Figure 2:
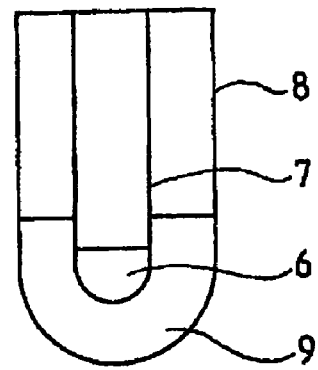
Figure 3:
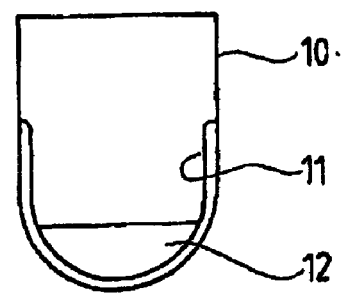

FIGS. 2 and 3 show two alternative vial arrangements to that in FIG. 1. In FIG. 2, luminophore-containing component 6 is held in vial 7 which is within an outer vial 8 holding TLC 9.

In FIG. 3, the inside wall of vial 10 is coated with a film 11 of microencapsulated TLC, with luminophore 12 in contact with film 11. Other vial arrangements are possible such as a "microvial" or pellet-like arrangement where the vial is spherical. For example, a microvial can comprise a core of luminophore surrounded by a spherical shell of TLC which is in turn surrounded by a transparent outer layer or "vial".

Figure 4:
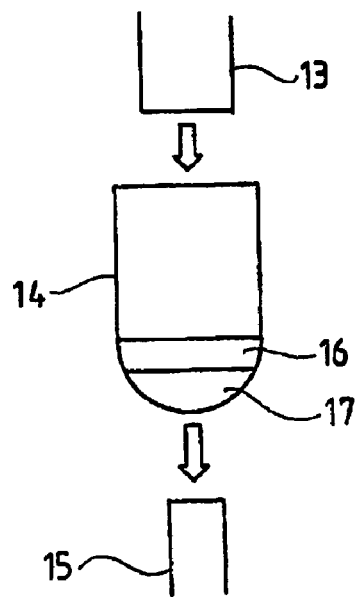
Figure 5:
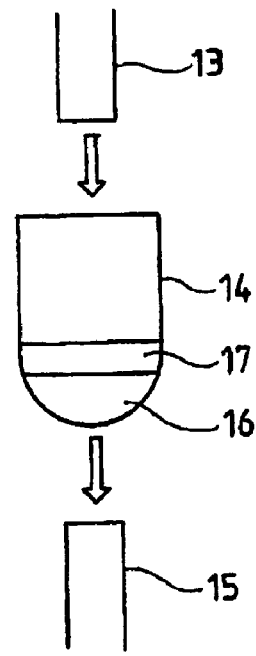
Figure 6:
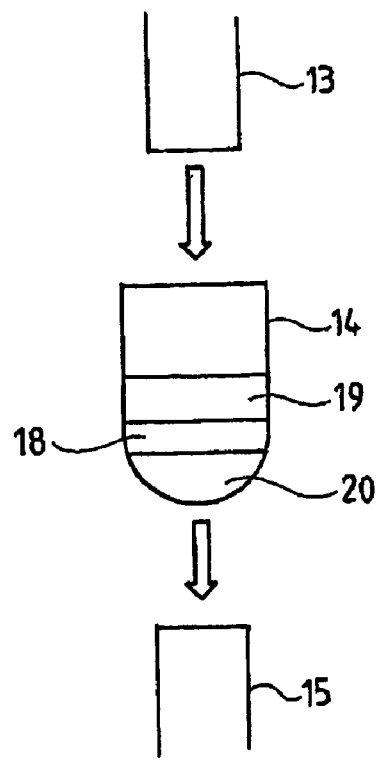

FIGS. 4 to 6 illustrate different ways of arranging the TLC and luminophore-containing components of systems according to the invention. In each arrangement, a light source 13 is positioned above the vial 14 containing the system while a detector 15 is positioned below the vial. It will be appreciated that the light source and detector can be in opposite positions.

In FIG. 4, luminophore-containing component 16 is layered over TLC 17. In FIG. 5, the components are reversed: that is, TLC component 17 is layered over luminophore-containing component 16. In the FIG. 6 arrangement however, luminophore-containing component 18 is layered between TLC components 19 and 20.

Figure 7:
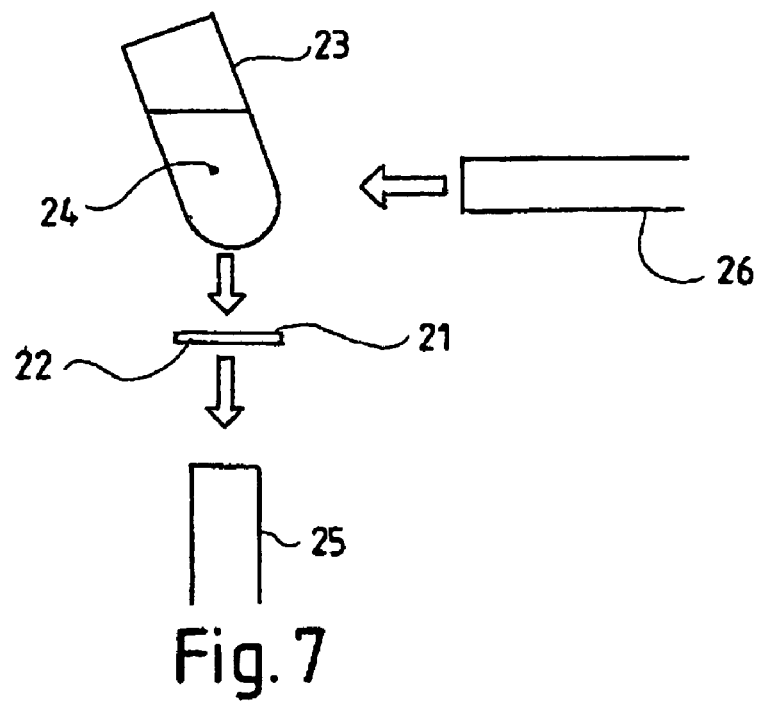
Figure 8:
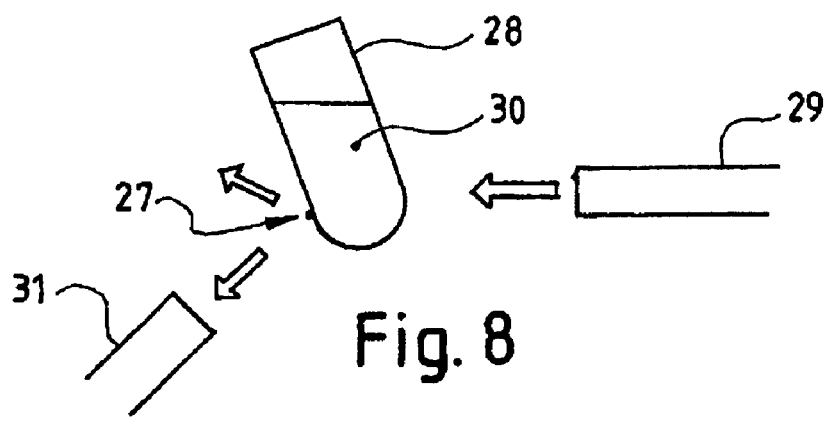
Figure 9:
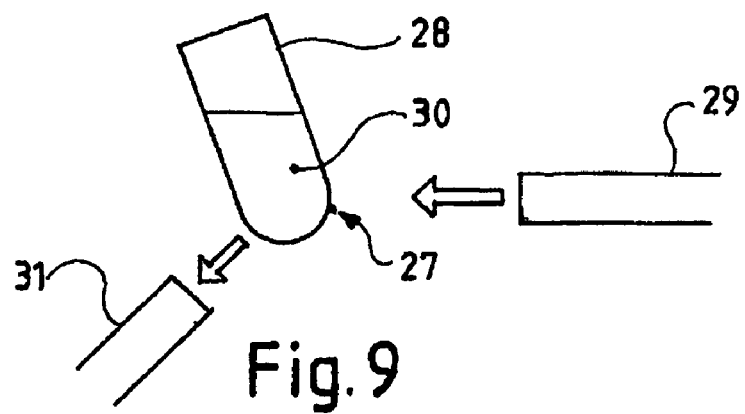

FIGS. 7 to 9 illustrate additional ways of arranging the TLC and luminophore-containing components of systems according to the invention.

In FIG. 7, a thin vial 21 containing luminophore 22 is positioned between vial 23, which contains TLC 24, and light detector 25. Light source 26 completes the system.

In FIG. 7, in the case where TLC 24 is a clearing point TLC, the system operates as follows. At temperatures above its transition temperature, TLC 24 is mostly clear, and will direct only a relatively small amount of light from source 26 to luminophore 22 and excite it. If, in addition, the light detector 25 is sensitive to only those wavelengths that luminophore 22 emits, and is insensitive to those wavelengths emitted by source 26, then at temperatures above the TLC clearing point, the light detector will sense relatively little light. At temperatures below its transition point, TLC 24 will reflect or redirect large amounts of light from source 26 in various directions, including the direction towards luminophore 22. When excited, luminophore 22 in turn will emit in various directions, including the direction towards the light detector 25. At the TLC's clearing point temperature, a small change in temperature will therefore result in a large change in detected luminescence. With a clearing point TLC, the system of FIG. 7 can be used to implement a "negative clearing point" system.

In FIG. 7, in the case where TLC 24 is a temperature-sensitive TLC, the system works as follows. At temperatures below its Red Start temperature, and above its clearing point, TLC 24 is mostly clear, and will reflect or redirect only a relatively small amount of light from source 26 to luminophore 22.

If light source 26 emits only a narrow band of wavelengths (e.g., a band 10 nm wide), then at a certain temperature between its Red Start and clearing point temperatures—the "source-enabling temperature"—TLC 24 will strongly reflect or redirect those particular wavelengths from source 26 in various directions, including the direction towards luminophore 22. When excited, luminophore 22 will in turn emit in various directions, including the direction towards the light detector 25. At the TLC's source-enabling temperature, a small change in temperature will therefore result in a large change in detected luminescence. With a temperature-sensitive TLC, the system of FIG. 7 can be used to implement a "positive temperature-sensitive" system.

In FIG. 8, a small dot of luminophore 27 lies on the outside of vial 28, on the side furthest away from light source 29. Vial 28 contains TLC 30 and light detector 31 completes the system.

The system in FIG. 8 works in substantially the same manner as the system in FIG. 1. Like the system in FIG. 1, the system in FIG. 8 can be used to implement a "positive clearing point" system when using a clearing point TLC, and a "negative temperature-sensitive" system when using a temperature-sensitive TLC.

The system in FIG. 9 has almost the same arrangement as the system in FIG. 8 except that the luminophore component 27 is located on the opposite side of the vial 30, closest to the light source 29. Like the system in FIG. 8, the system in FIG. 9 can be used to implement a "positive clearing point" system when using a clearing point TLC, and a "negative temperature-sensitive" system when using a temperature-sensitive TLC.

Figure 10:
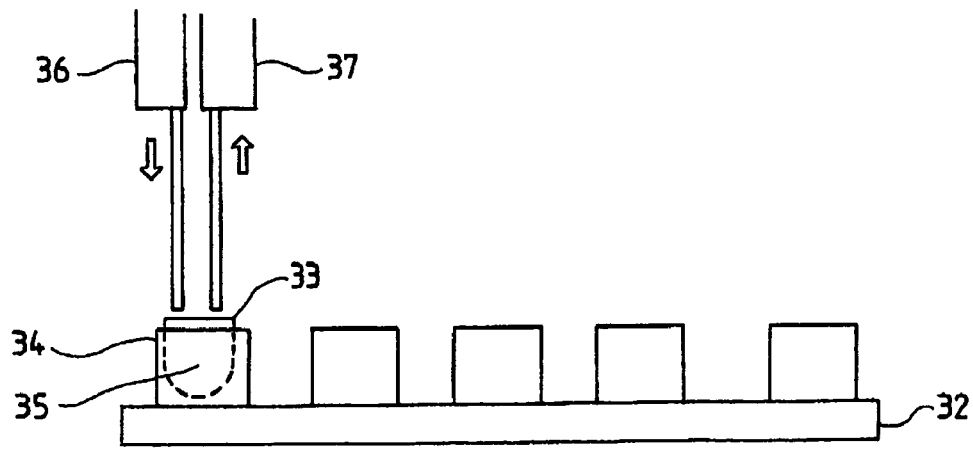
FIG. 10 is a schematic representation of an application of the system to micro-environment temperature calibration.

FIG. 10 is a representation of a thermal cycler comprising a metal block 32 having a plurality of receptacles thereon for receiving reaction vials. A reaction vial 33 is shown in one of the receptacles 34. Vial 33 holds a TLC/luminophore system as shown in FIG. 5. System 35 in vial 33 is irradiated by light source 36 and any emitted luminescence is detected by detector 37.

By varying the temperature of block 32 and by monitoring emitted luminescence, the temperature of a chosen position in the block can be calibrated. (In the figure the chosen position is receptacle 34.) Via the method of the invention, it can therefore be determined which block positions are the coolest or hottest and what temperature differences there are between positions.

Figure 11:
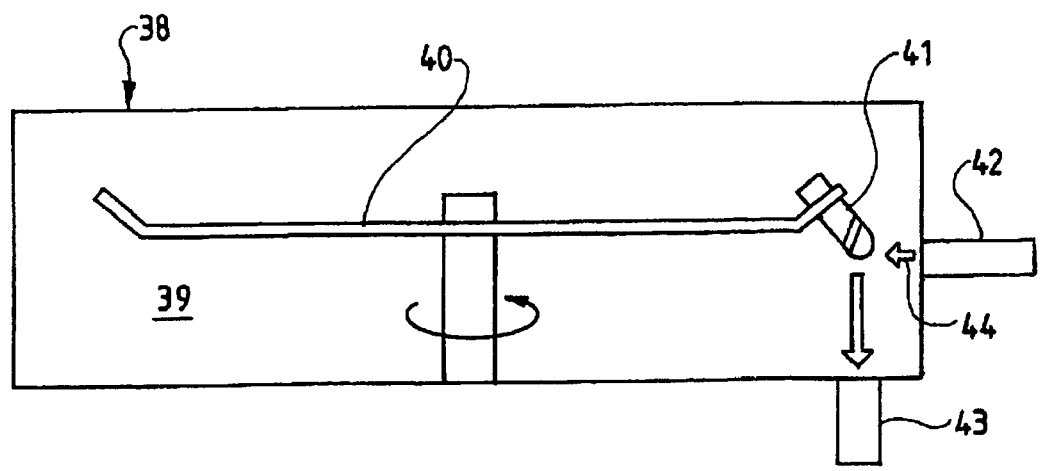
FIG. 11 is a schematic representation of yet another application of the system to micro-environment temperature calibration.

FIG. 11 is a schematic representation of an alternative thermal cycler which is a real-time thermal cycler commercially available from Corbett Research and which is called a "Rotor-Gene™". This is the device disclosed in the international application referred to above (No. PCT/AU98/00277). In FIG. 11, there is shown device 38 comprising a chamber 39 having rotor 40 therein which is driven by a motor not shown in the drawing. Chamber 39 is heated and the device has ancillary equipment for controlling the temperature of the chamber. Rotor 40 can hold a plurality of reaction vials one of which is indicated at 41. Device 38 includes a light source 42 and detector 43. The light source emits light that includes light of a wavelength that excites a luminophore included in a reaction vial as the vial passes through light beam 44 with rotation of rotor 40. Any emitted luminescence can then be detected by detector 43.

An important aspect of the operation of device 38 is the accurate control of the temperature of the contents of reaction vials. This is equivalent to how accurately the temperature of the air surrounding the reaction vials is controlled. However, the temperature within a vial may not necessarily be the same as the chamber temperature as sensed by the Rotor-Gene's temperature control equipment so compensation has to be made in that equipment.

The systems and method of the invention can be used to accurately determine the temperature in vials and hence to calibrate temperature control while the vials are rotating. Calibration of device 39 can be effected using the following procedure:

1. a vial containing a suitable TLC plus luminophore system is placed in rotor 40 and the rotor run at its operational speed;
2. the output of the detector 43 is monitored while the temperature in chamber 39 is slowly increased in small steps (such as 0.1° C.);
3. as the oven heats, the TLC will pass through an event temperature resulting in a large change in detected luminescence;
4. the data from step 3 is used to determine the chamber temperature corresponding to the TLC event temperature, thus providing one calibration point;
5. steps 1 to 4 can be repeated using TLC/luminophore systems with differing temperature characteristics (ideally the TLC of one system has an event temperature that is the same as the desired calibration temperature);
6. the data of step 5 is used to provide a temperature calibration curve with regard to chamber temperature versus reaction vial temperature.

Using the calibration curve generated by the foregoing procedure, appropriate compensation can be made to the temperature control system so that the desired temperature is attained in actual reaction vials.

Figure 12:
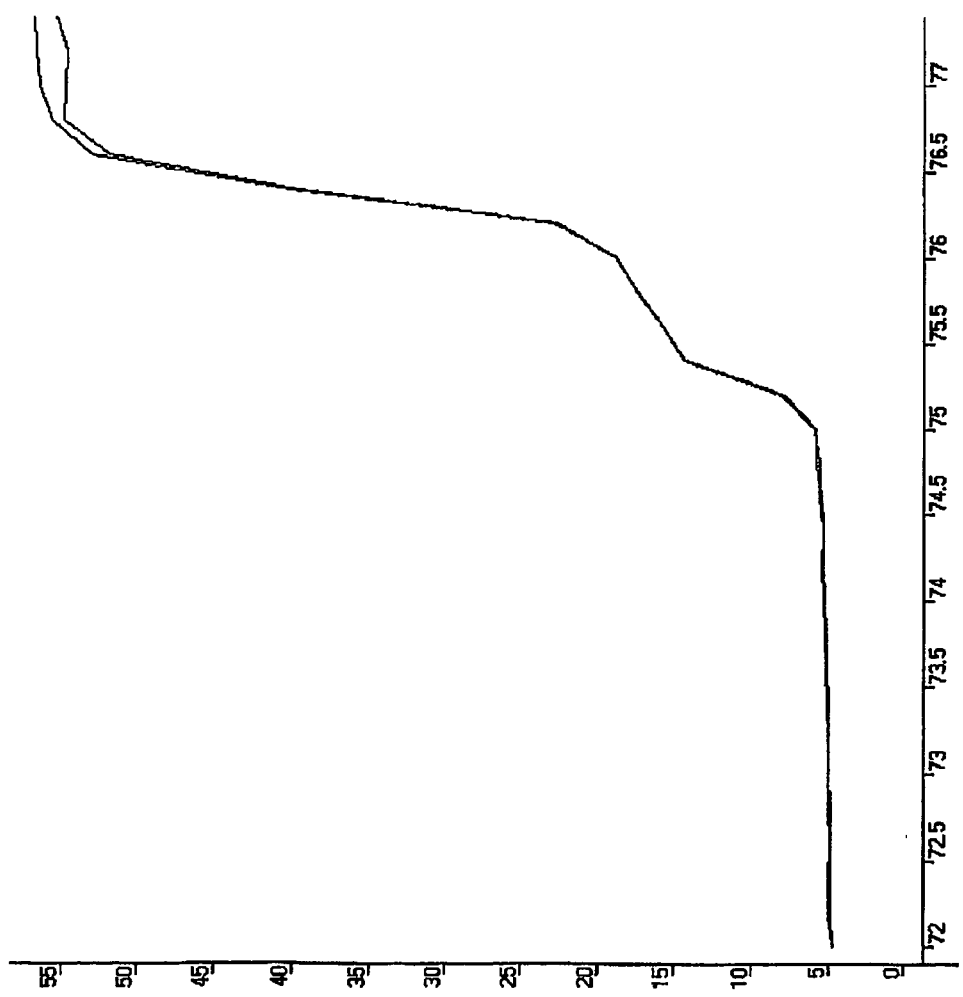
FIG. 12 is a graph of luminescence versus temperature generated during a temperature calibration experiment using a system comprising a clearing point TLC and a luminophore.

The graph comprising FIG. 12 gives representative results of a calibration as described in the previous paragraphs. Duplicate vials containing 15 µL of Red Clearing Point TLC BN/R75C (Hallcrest Inc.) and 1 µL (30 µM) aqueous solution of 5' CY5 d(TTTTTTTTTT) NONE 3' fluorophore (Biosearch Technologies Inc. of 81 Digital Drive, Novato, Calif., USA) were placed in a Rotor-Gene™ thermal cycler, using a vial arrangement as per FIG. 6. The cycler rotor was activated and the temperature increased in steps of 0.2° C. over an appropriate range while fluorescence emitted from the vials was measured using the cycler's luminescence detection system. The light source had a passband of 10 nm centred on 625 nm. The light detector was sensitive to wavelengths of 660 nm and longer.

The graph in FIG. 12 has the luminescence versus temperature characteristic of a positive clearing point system.

The graph shows two large transitions in luminescence, one at 75.3° C. and another at 76.4° C. The TLC/fluorophore combination in the vials was known to have transitions at 75.8° C. and 76.9° C. The results show that the temperature control of this particular Rotor-Gene, at settings of 75.3 and 76.4° C., gives actual temperatures that are 0.5° C. higher than expected. At these settings, therefore, one can attain close to the ideal temperature in the vials by applying a minus 0.5° C. compensation to the Rotor-Gene's temperature control.

Figure 13:
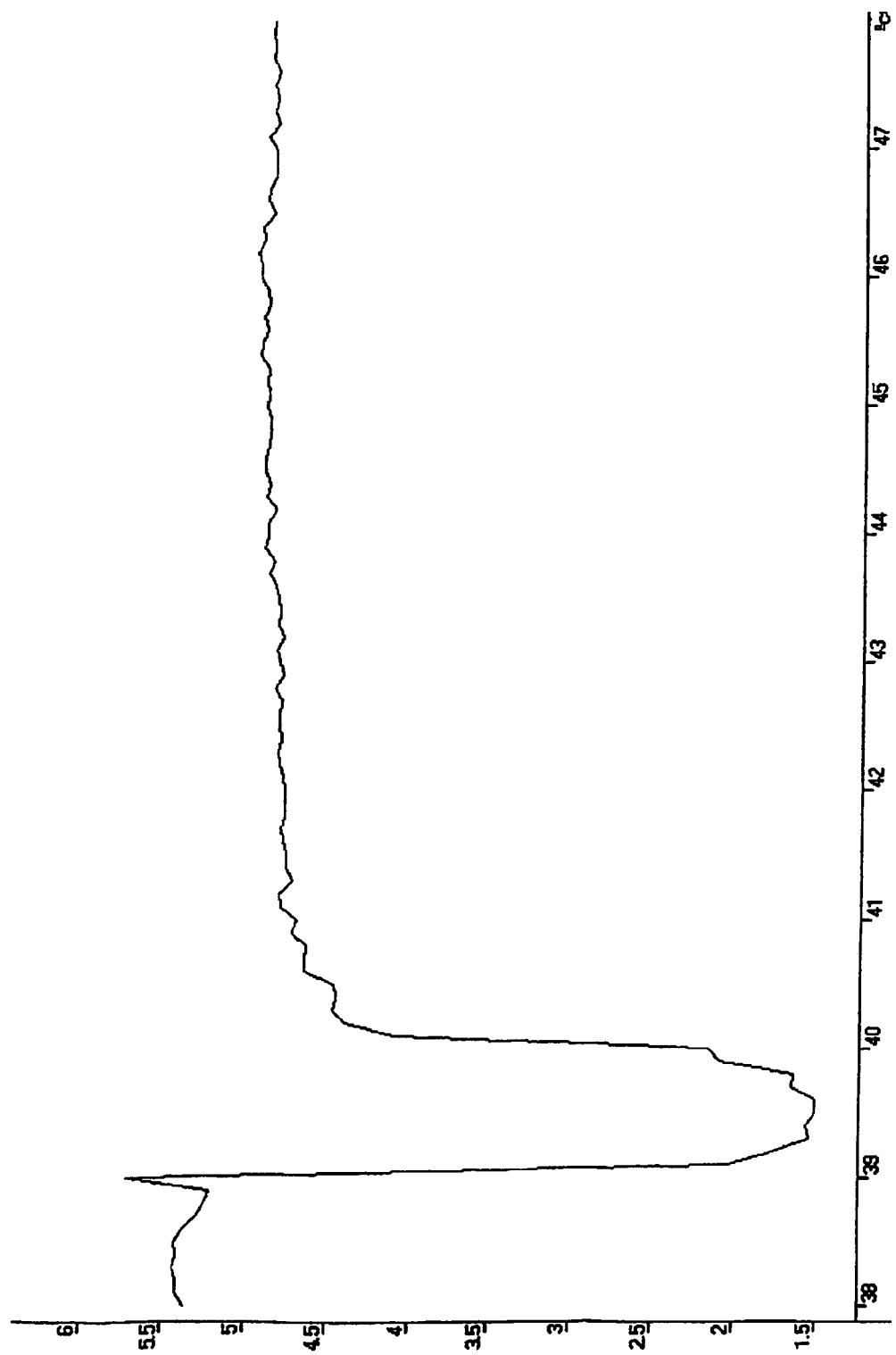
FIG. 13 is a graph of luminescence versus temperature for a system comprising a temperature-sensitive TLC and a luminophore.

The graph comprising FIG. 13 shows the results of an experiment conducted using a system comprising a temperature-sensitive TLC. A vial containing 20 µL of R40C1W temperature-sensitive TLC (Hallcrest Inc.) and 1 µL (30 µM) aqueous solution of 5' ROX d(TTTTTTTTTT) 3' fluorophore (Biosearch Technologies Inc.) was placed in a Rotor-Gene™ thermal cycler as in the previous experiment using a vial arrangement as per FIG. 6. The cycler rotor was activated and the temperature increased in steps of 0.1° C. over a range of 38 to 45° C. while fluorescence emitted from the vial measured using the cycler's luminescence detection system. The light source had a passband of 10 nm centred on 585 nm. The light detector had a passband of 10 nm centred on 610 nm.

The graph in FIG. 13 has the luminescence versus temperature characteristic of a negative temperature-sensitive system.

From FIG. 13, it can be seen that there are two sharp transitions which can be used for temperature calibration a negative—slope transition at 39.1° C., and a positive-slope transition at 40.1° C. At temperatures between 39.1° C. and 40.1° C., the TLC significantly blocked light emitted by the fluorophore from reaching the detector, and significantly blocked light from the light source from reaching the fluorophore. Below 39.1° C. and above 40.1° C., the TLC allowed the light source to excite the fluorophore and allowed the emitted fluoresence to reach the detector. In this particular combination of TLC, luminophore, light source, and light detector, the source- and detector-blocking actions of the TLC occurred at closely related temperatures, and so the graph does not allow one to detect the separate effects of the two blocking actions, only their combined effects.

Figure 14:
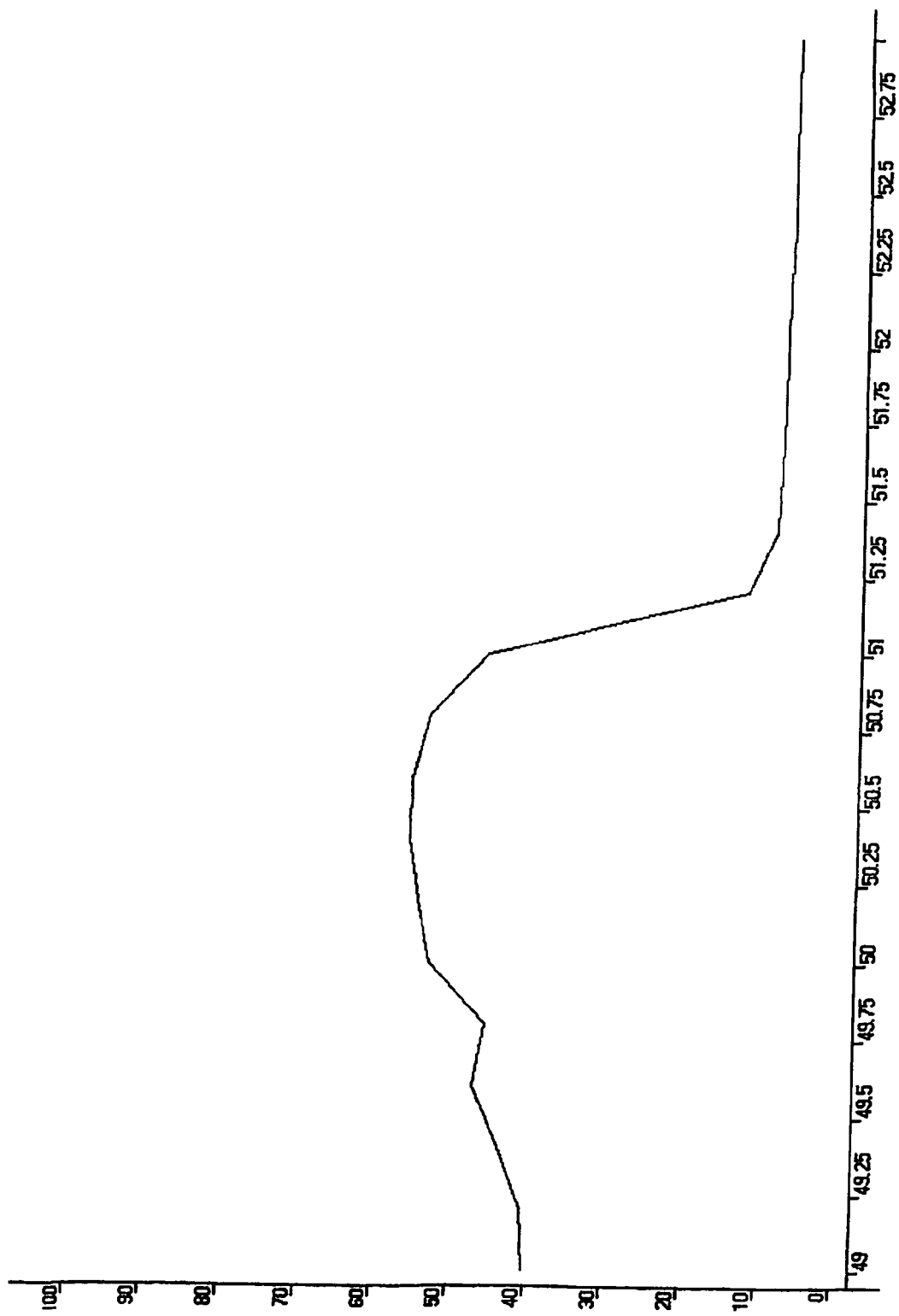
FIG. 14 is a graph of luminescence versus temperature for a system comprising a clearing point TLC and a luminophore.

The graph comprising FIG. 14 shows the results of an experiment conducted using a system comprising a clearing point TLC. A vial containing 50 µL of BN/G50C clearing point TLC (Hallcrest Inc.) was placed in a Rotor-Gene™ thermal cycler using the vial arrangement of FIG. 7. As per the arrangement in FIG. 7, component 21 comprising a thin paper disk, coated on both sides with component 22 comprising green luminescent dye from a green TextSurfer highlighter pen (Staedtler (Pacific) Pty. Ltd. of 1 Inman Road Dee Why NSW Australia), was secured over the light detector. The cycler rotor was activated and the temperature increased in steps of 0.2° C. over a range of 49 to 53° C. while luminescence emitted from the coated paper disk was measured using the cycler's luminescence detection system. The light source had a passband of 20 nm centred on 470 nm. The light detector had a passband of 10 nm centred on 510 nm. The TLC was known to have a clearing point of approximately 51.2° C.

From FIG. 14, it can be seen there is a sharp negative-slope transition at 51.2° C. At temperature settings of 51.2° C. and above, the TLC was clear, and reflected or redirected relatively little light into the luminescent disk. At temperature settings of around 50° C. and below, the luminescence was relatively high, as the opacity of TLC reflected or redirected some light from the light source to the luminescent disk, which in turn excited the detector. At temperatures just below 51.2° C., the luminescence varied sharply with temperature, with the TLC/luminophore system providing a calibration point at 51.2° C.

The graph in FIG. 14 has the luminescence versus temperature characteristic of a negative clearing point system.

Figure 15:
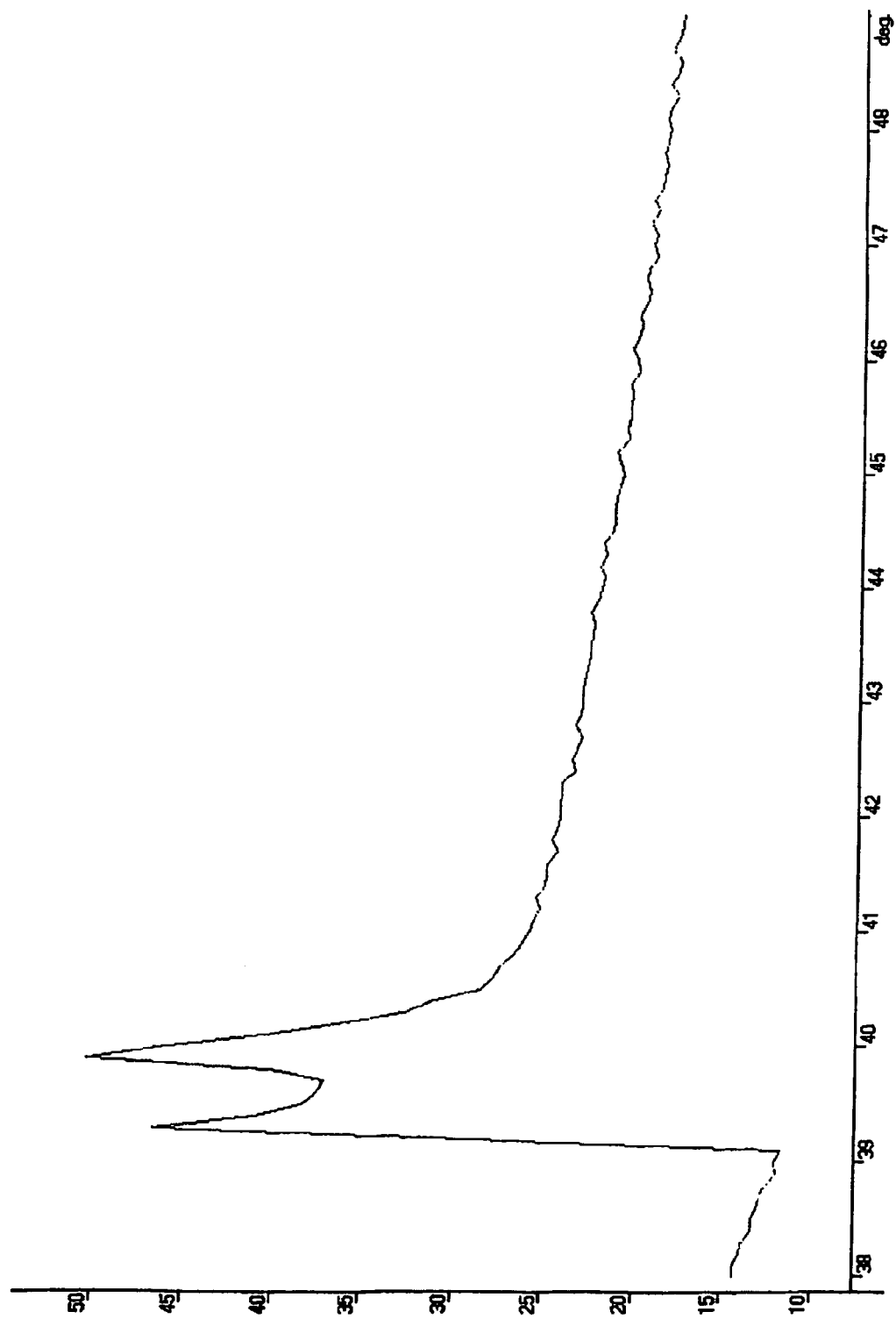
FIG. 15 is a graph of luminescence versus temperature for a system comprising a temperature-sensitive TLC and a luminophore.

The graph comprising FIG. 15 shows the results of an experiment conducted using a system comprising a temperature-sensitive TLC. A vial containing approximately 50 μL of R40C1W (Hallcrest Inc.), was placed in a Rotor-Gene™ thermal cycler using the vial arrangement of FIG. 7. As per the arrangement in FIG. 7, component 21 comprising a thin paper disk, coated on both sides with component 22 comprising pink luminescent dye from a pink Stabilo Boss highlighter pen (Schwan-STABILO Schwanhausser GmbH & Co., of Schwanweg 1, 90560 Heroldsberg, Germany), was secured over the light detector. The cycler rotor was activated and the temperature increased in steps of 0.1° C. over a range of 38 to 49° C. while luminescence emitted from the coated paper disk was measured using the cycler's luminescence detection system. The light source had a passband of 10 nm centred on 585 nm. The light detector had a passband of 10 nm centred on 610 nm.

From FIG. 15, it can be seen that the detected luminescence peaks sharply at temperature settings of 39.3° C. and 39.9° C. Either or both of these event temperatures may be used as temperature calibration points.

It will be appreciated by one of skill in the art that many changes can be made to the systems and methods exemplified above without departing from the broad ambit and scope of the invention.

The term "comprise" and variants of the term such as "comprises" or "comprising" are used herein to denote the inclusion of a stated integer or stated integers but not to exclude any other integer or any other integers, unless in the context or usage an exclusive interpretation of the term is required.

Any reference to publications cited in this specification is not an admission that the disclosures constitute common general knowledge in Australia.

The invention claimed is:

1. A system for the optical determination of a predetermined event temperature of a micro-environment, the system comprising a light source, a light detector, and a thermochromic liquid crystal in said micro-environment in combination with a luminophore, wherein said thermochromic liquid crystal is in liquid form during use and prevents or allows excitation of the luminophore by the light source in a temperature-dependent manner, wherein:
  A) the thermochromic liquid crystal lies between
    i) the light source and the luminophore; and/or
    ii) the luminophore and the light detector; or
  B) the thermochromic liquid crystal, luminophore, and light detector are positioned so that
    i) light reflected by the thermochromic liquid crystal irradiates the luminophore, and the light detector is positioned to detect light emitted by the luminophore; and/or
    ii) light emitted by the luminophore is reflected by the thermochromic liquid crystal, and the light detector is positioned to detect said reflected light, and
wherein said luminophore and said thermochromic liquid crystal are present as discrete layers within a container for said system.

2. The system according to claim 1, wherein said thermochromic liquid crystal is a clearing point crystal.

3. The system according to claim 1, wherein said thermochromic liquid crystal is a temperature-sensitive crystal.

4. The system according to claim 1, wherein said system comprises a plurality of thermochromic liquid crystals.

5. The system according to claim 1, wherein said luminophore is a liquid, a gas or a solid.

6. The system according to claim 5, wherein said luminophore is a solid which is bound to, or coated onto, a surface.

7. The system according to claim 1, wherein said luminophore is fluorescent or phosphorescent.

8. A thermal cycler comprising the system according to claim 1.

* * * * *